Patented Feb. 25, 1930

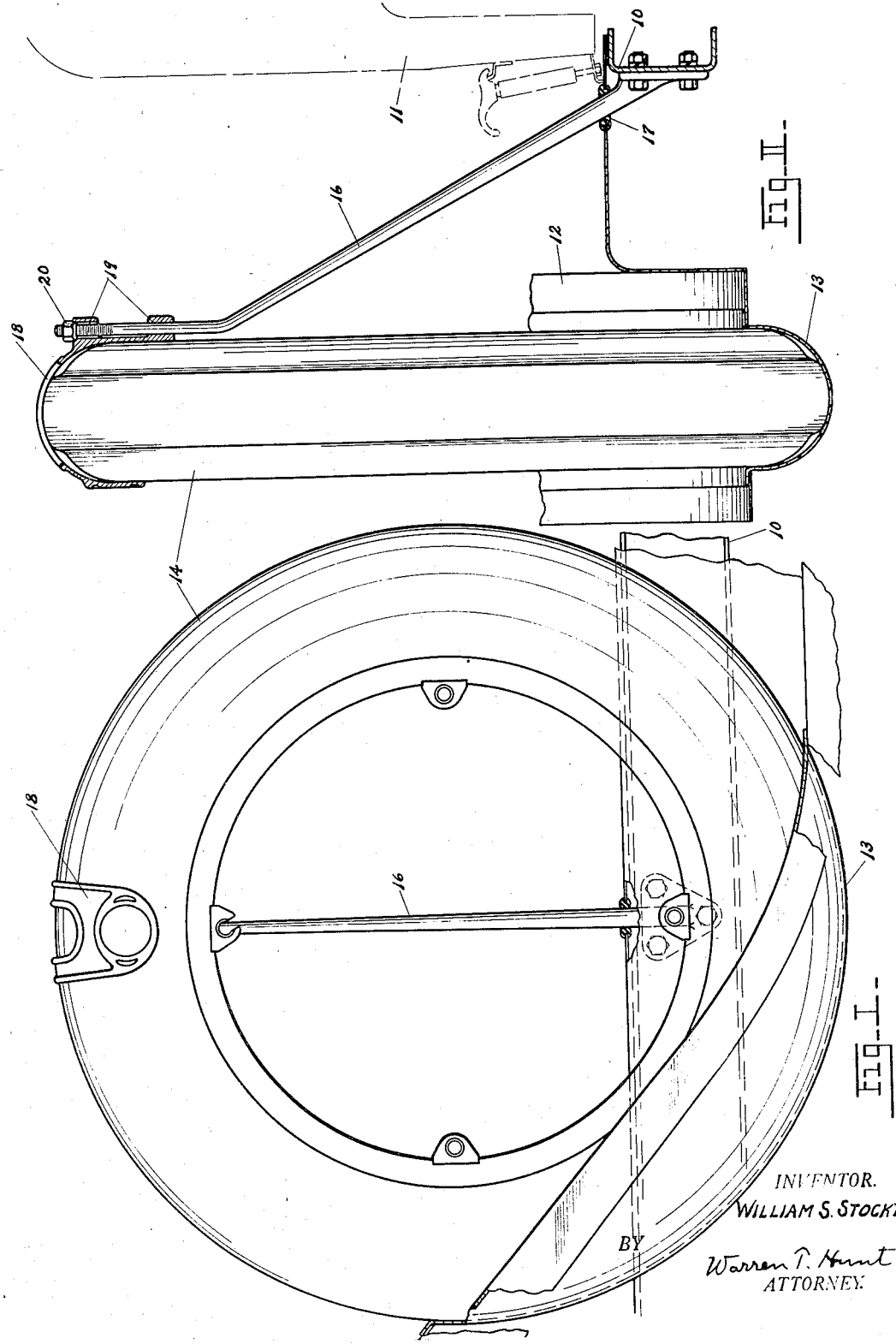

1,748,089

UNITED STATES PATENT OFFICE

WILLIAM S. STOCKTON, OF TOLEDO, OHIO, ASSIGNOR TO THE WILLYS-OVERLAND COMPANY, OF TOLEDO, OHIO, A CORPORATION OF OHIO

TIRE CARRIER

Application filed January 18, 1928. Serial No. 247,601.

My invention relates to spare tire carriers for automobiles and it has particular relation to carriers which are affixed to the front fenders of automobiles.

One object of the invention is to provide a simple and inexpensive means for securing a spare tire to a tire well formed in the front fender.

Another object of the invention is to provide an easily demountable carrier which will hold the tire securely and which maintains the elements comprising the same under tension thereby obviating any possibility of vibration and noise.

It is an additional object of the invention to provide a tire carrier in which rigid means are secured to the frame of the automobile and maintain the tire in a stressed condition, thereby eliminating the vibration and rattle which would otherwise be present by reason of the unbalanced weight of the tire.

According to the present invention there is provided a well or socket in the lower portion of the front fender wherein a tire may be rested. Its position is made secure by means of a rigid tension member formed integrally with the frame and extending to the top of the tire. The tension member is demountable and when in its operative position, maintains the tire in a stressed condition. A clearer understanding of the principles herein involved may be had by referring to the drawings which illustrate a preferred embodiment.

Figure I thereof is an elevational view of the tire carrier and illustrates its relation to the automobile, and Fig. II is an end view of the structure illustrated in Fig. I.

In the drawings only one of the two conventional longitudinal frame members 10 is illustrated; these support a body 11 as well as fenders 12 which may be secured both to the frame and the body structure. The portion of the fender extending downwardly from the front wheel is provided with a socket or well 13 of such dimensions as to accommodate a tire 14 for the vehicle.

A rigid bar 16 is bolted at its lower extremity to the longitudinal frame member 10 and is inclined upwardly through an aperture 17 formed in a horizontal portion of the fender. The upper extremity of the rod is threaded and is vertically disposed to accommodate a hook shaped member 18 which fits over the tire casing. The inner side of the hook member includes two spaced elongated apertures 19 through which the rod extends. A bolt 20 secures the U-shaped tire engaging member to the rod and when tightened maintains the elements in a stressed condition.

It will be observed that the rigid elongated member which interconnects the tire engaging member not only insures against vertical movement of the tire, but prevents lateral play as well, and otherwise prevents vibration which results from the unbalanced overhanging weight of the fender and tire. In addition to the fact that the elements are arranged to avoid vibration, the carrier is of a simple design which requires but little manipulation to remove or secure a tire in position.

Although there is described but a single embodiment of the invention, it will be apparent that minor changes may be introduced without departing from the inventive concept, and I desire therefore that it be limited only as indicated in the appended claims.

I claim:

1. In an automobile having a frame, a spare tire carrier comprising a fender having a tire well, a member for engaging the upper portion of the tire in vertical alignment with the well having a vertically disposed aperture on the side thereof and a rod secured to the frame and extending diagonally upwardly to a point substantially above the inner side of the well and from thence vertically upward for the remaining portion thereof through the aperture inter-connecting the tire engaging member with the frame, and means for securing the engaging member firmly to the tire.

2. In an automobile having a frame, a fender overlying the frame and extending laterally therefrom, said fender having a well therein for receiving a tire and an opening adjacent the frame, a tire bracing member secured to said frame beneath the fender and projecting through said opening upwardly and outwardly to a point substantially above the inner side of said well, the upper portion of said brace member being bent with respect to the lower portion to extend vertically, a clamp adapted to engage a tire at a point vertically above the well, said clamp having spaced apertures in vertical alignment adapted to receive the vertical upper portion of the brace member, and means adapted to force said clamp downwardly to engage the tire whereby said tire is forced into the well.

In testimony whereof I affix my signature.

WILLIAM S. STOCKTON.